Dec. 20, 1960 J. ARCHER ET AL 2,965,801
METHOD OF AND APPARATUS FOR POSITION-SELECTION, SCANNING AND THE LIKE
Filed Dec. 20, 1955 2 Sheets-Sheet 1

INVENTOR
JOHN ARCHER
GEORGE VINCENT CARCASSON
BY [signature]
AGENT

Dec. 20, 1960 J. ARCHER ET AL 2,965,801

METHOD OF AND APPARATUS FOR POSITION-SELECTION, SCANNING AND THE LIKE

Filed Dec. 20, 1955 2 Sheets-Sheet 2

INVENTOR
JOHN ARCHER
GEORGE VINCENT CARCASSON
BY
AGENT 2,965,801

METHOD OF AND APPARATUS FOR POSITION-SELECTION, SCANNING AND THE LIKE

John Archer and George Vincent Carcasson, London, England, assignors, by mesne assignments, to North American Philips Company, Inc., New York, N.Y., a corporation of Delaware Filed Dec. 20, 1955, Ser. No. 554,326

Claims priority, application Great Britain Dec. 23, 1954

12 Claims. (Cl. 315—169)

Figure 1:
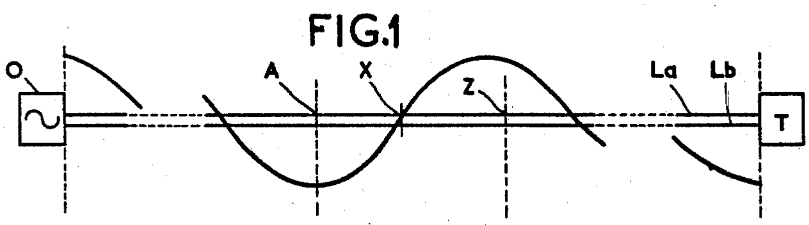

This invention relates to methods of position-selecting, scanning and the like and to apparatus for performing such operations. Such apparatus and methods may be applied to television and like systems, information storage devices, switching systems and generally where it is required to select from a plurality of positions or elements or to scan a plurality of positions or elements.

According to one aspect of the invention apparatus for selecting from a plurality of positions or elements or for scanning a plurality of positions or elments, comprises an electrically conductive double line having sections each associated with one of said positions or elements, and means for establishing electro-magnetic standing waves so located on the line that a node selects a position or element.

In principle it may be possible to identify a point along a twin Lecher line by means of an antinode of standing waves set up in the line, but such method of identification is in any event difficult owing to the sinusoidal distribution of the A.C. voltage along the line which gives very flat antinodes. Matters may be improved by superimposing standing waves at a higher harmonic frequency with an antinode coincident with the selected antinode of the fundamental standing waves. However, in the present invention a node has been chosen for identifying the positions or elements because the position of a node is much sharper and better defined than that of an antinode.

Apparatus according to the aforesaid aspect of the invention may for example comprise a Lecher line having an operative portion associated with a row of positions or elements along which portion a node of an electric wave on the line is moved or located so as to select a desired position or element.

If desired, the operative portion of such a line may be folded, e.g. in a zig-zag manner, so as to selected from an array of positions or elements arranged on a surface, or for example, to allow scanning of a plurality of parallel rows of positions or elements similar to the scanning arrangement used for television.

Alternatively, and according to a further aspect of the invention, apparatus for selecting any one of an array of positions or elements arranged on a surface or for scanning said positions or elements, comprises a pair of grids electrically separated from each other and having grid elements of one grid operatively intersecting grid elements of the other grid at localised intersection regions corresponding to said position or elements, means for selecting anyone of the grid elements of one grid, further means for selecting anyone of the grid elements of the other grid, at least one of the selecting means comprising an electrically conductive double line having sections each associated with one of the grid elements of the corresponding grid together with means for establishing electro-magnetic standing waves on said line so located thereon that a node of the wave selects a grid element.

One of the two selecting means may comprise a known switching device, but preferably two double lines are used, one for each selecting means, together with separate means for establishing standing waves.

The node on a double line may be moved to a desired position along an intermediate operative portion of the line located between end portions, or circuits equivalent thereto, by varying in a complementary manner the electrical lengths of the said end portion or circuits while maintaining constant the frequency of the standing waves. In many applications this is more convenient than a method involving variation of the frequency of the waves.

The invention may be applied where the selection of a position or element requires information to be displayed visually, for example in television or picture telegraphy. In this connection it may be observed that known scanning methods for television can basically be classified under two types: (1) Beam deflection systems, employing e.g. a light beam or electron beam, and (2) distributor systems. Hitherto the first type of system has been preminent, using first mirror drums or the like and later cathode ray tubes. The second type of system has had very litlte application and then only when the number of lines in the picture was very low. It failed when the number of lines was increased to present standards mainly through difficulties of distribution which result from the higher scanning speeds. An advantage of distribution systems as compared with beam deflection systems is the possibility of drastic reduction of the axial depth of the display device of a television receiver.

Scanning of a distributive type may be effected in accordance with the invention by causing a node on a double line to control the positional distribution of anode current in an electric discharge system comprising a cathode and an anode within an evacuated enveolpe and a luminescent screen. Use of electric discharge has the further advantage that picture modulation of the anode current can readily be obtained.

In particular, an electric discharge device according to a further aspect of the invention comprises a luminescent display screen, a substantially planar cathode, a substantially planar anode, a pair of grids electrically separated from each other and having a grid elements of one grid operatively intersecting grid elements of the other grid at localised intersection regions, and an electrically conductive double line having sections each associated with one of the grid elements of a grid, the grids being located between said cathode and anode so as to be adapted to act together as a control grid system for causing anode current and consequent screen excitation to have a value at a selected intersection region which value differs from the values obtained in other regions.

Generally, for applications of the type to be described, a single position or element has to be selected from a plurality of positions or elements. For this purpose one node alone, e.g. a voltage node, is necessary and the operative portion of an electrically conductive double line will have a maximum length of one half wavelength, since a greater length would otherwise permit two voltage nodes to be present at the same time.

The electromagnetic standing waves preferably are produced by a radio-frequency oscillator, the frequency of which is sufficiently high to allow adequate definition of a node while at the same time the frequency should naturally not be so high as to unduly restrict the length of the operative portion of the line. Thus, for a television display device such as that described below and having a picture width of, say, about 50 cm. the operative portion of a Lecher line effecting the horizontal line scan should be at least 50 cms. which corresponds to a maximum standing wave frequency of 300 mc.

In one embodiment of a television or like display device employing an evacuated envelope, a single Lecher line is used for the line scan, such Lecher line having connected to it within the envelope $n$ parallel lateral single-conductor extensions constituting the grid elements of a control grid structure in a planar vacuum system, the travelling voltage node selecting successively one only of said extensions as the operative extension and applying through rectification means negative cut-off bias to all other extensions. In a similar manner, a second Lecher line at right angles to the first may effect the frame scan and has $m$ lateral extensions constituting the grid elements of a second control grid of the system so that anode current in the vacuum system is only allowed to flow in the region of the intersection between the two grid elements which at any instant are at a voltage above cut-off with respect to the cathode. $n$ and $m$ indicate the number of picture elements per line and of lines per frame appertaining to the selected television standard.

Figures 2, 3:
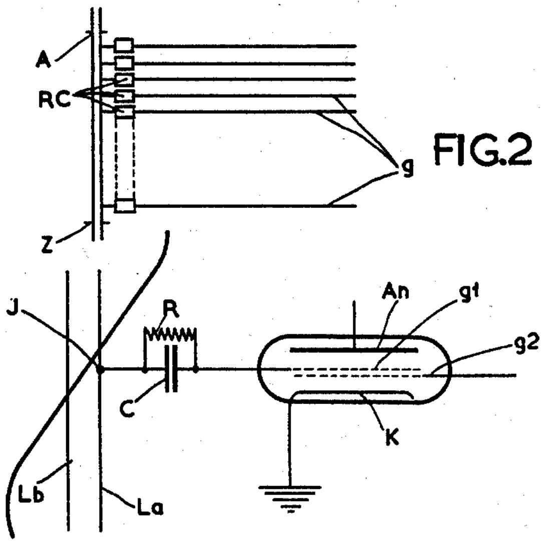
Figure 4:
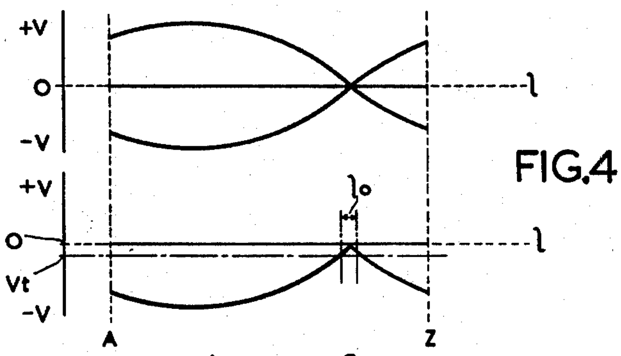
Figure 5:
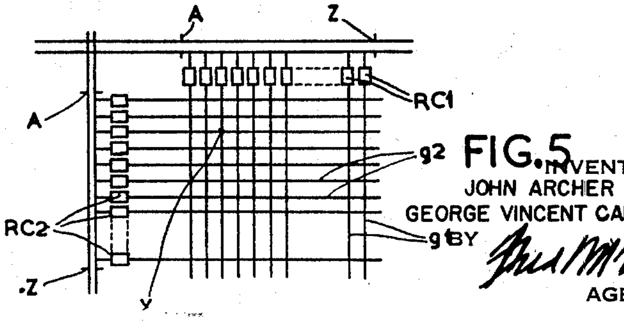
Figure 6:
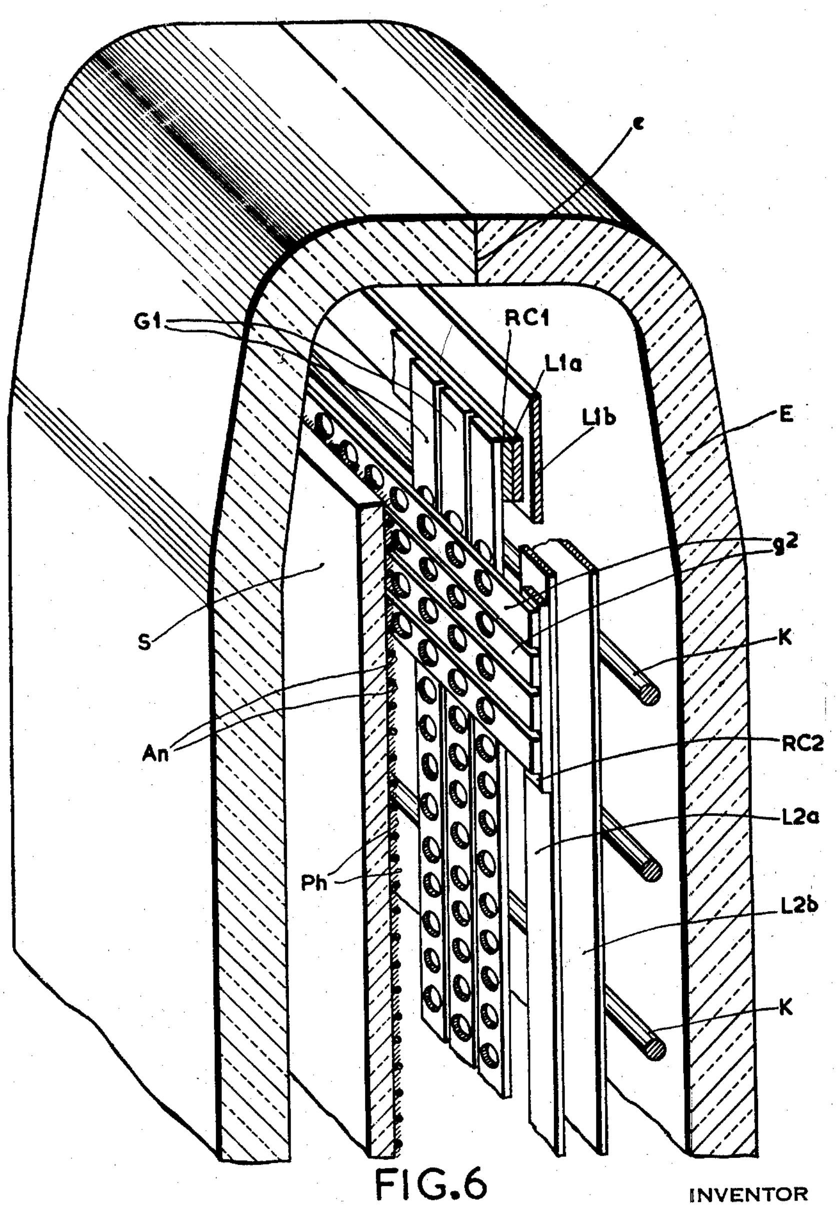

Such a system will now be described in greater detail with reference to Figures 1 to 6 in which:

Figure 1 is a diagram showing one of the two Lecher lines in its equivalent extended form, Figure 2 shows the same line with a series of grid wire extensions, Figure 3 is the equivalent circuit diagram of the same Lecher line illustrating the operation of one of the extensions, Figure 4 is a voltage graph, Figure 5 shows the combination of two systems such as that of Figure 2 for effecting the line and frame scans respectively, and Figure 6 is a vertical cross section of the device.

Referring now to the drawings and, more particularly to Figure 1, one of the two twin Lecher lines is shown at L$a$, L$b$ and has a length equal to several wavelengths.

The selected voltage node is indicated at X and the operative portion of the line is the portion AZ corresponding substantially to one dimension, e.g. the width, of the picture screen. The selected voltage node may be caused to travel along the line portion AZ by keeping the frequency constant and varying the effective lengths of the portions of line on each side of section AZ in complementary fashion, while maintaining constant the total effective length of the line. This may be done e.g. by variable reactance means such as reactance valves controlled by sawtooth generators. In Figure 1 the unit O may comprise the oscillator together with one of such reactance means, the unit T comprising the complementary reactance means. As an alternative, the selected node X can be caused to travel from A to Z for the scanning of one line by varying the frequency of oscillator O and maintaining the tuning of the line by means of the element T. In either case the node is rapidly retraced by a reverse process during the line blanking period so that the scan can be repeated from A to Z.

The lengths of line extending outwardly from points A and Z may be coiled or replaced by equivalent networks for the sake of compactness.

The action of one of the grid extension wires $g$ (Figure 2) will now be explained with reference to Figure 3. The bi-grid triode structure shown is in reality a planar electrode structure having substantially the same dimensions as the picture screen, the cathode K being a planar structure constituted by a number of parallel filaments fed in parallel, and the planar anode A$n$ being associated with a phosphor screen constituting the picture screen. The element shown as the grid $g1$ in the triode is one of the wires $g$ (Figure 2) connected to the Lecher line A—Z and it is shown coupled to a junction point J of the line through a resistance-capacitance network CR. Whenever RF voltages are present on the line AZ at a given junction point J, as occurs at all points other than a node, grid current is drawn from the cathode K at the RF peaks and establishes a negative charge on the corresponding grid wire $g1$ which produces a cut off bias potential substantially preventing anode current flow to the planar anode A$n$. Such charge, produced by grid rectification and stored by the capacitor C, leaks away at a predetermined rate through the leak resistance R, but negative charge is renewed by means of further grid current at a sufficient rate to maintain the grid wire $g1$ at or below said cut-off bias potential. However, when the voltage node is coincident with a given junction point J, the bias charge leaks away and is not renewed so long as radio frequency voltage is absent. This enables anode current to flow temporarily to the planar anode A$n$ thus causing, subject to whatever control happens to be applied by grid means $g2$, luminescence at a selected portion of the picture screen. Such luminescence is modulated in accordance with the video signal as described below.

Figure 4 shows in the first graph the envelope of the RF voltage distribution along the line as a function of the length 1 thereof, and the second graph shows the corresponding distribution of the mean bias voltage on the respective set of grid wires $g$, which are connected to the line along the operative portion thereof. The mean bias voltage is below the cut-off or threshold value V$t$ over the whole succession of grid wires except within a small region 1$o$ equal to or less than the picture element width and including a single grid wire. Thus only the single grid wire so affected will be allowed to rise above the threshold voltage. Radio frequency voltage will also be present on grid wires superposed on the bias voltage except at the nodal point, but the effect of these at most will be to allow anode current at the peaks of the said radio-frequency voltage. The sharpness of the peak 1$o$ of the bias graph may, if desired, be accentuated by superimposing on the line standing waves at a higher harmonic frequency (not shown).

In Figure 5 the two Lecher lines corresponding to the line and frame scans are shown together schematically with their respective sets of grid wires $g1$ and $g2$, and it will be appreciated that only one wire of each set will at any time be above cut-off potential thus allowing anode current substantially only at their intersection X.

Although Figure 3 may suggest the provision of a large number of separate CR networks constituted by individual orthodox components, in practice such networks may be provided by a single strip of imperfectly insulating dielectric material bonded or otherwise secured between one conductor of a Lecher line and a set of grid wire ends. Such a construction is shown in Figure 6 in which the vertical grid elements $g1$ are constructed as strips of sheet metal perforated at regular intervals to permit passage of anode current. The ends of such strips are anchored to a strip L1$a$ constituting one conductor of the Lecher line L1$a$, L1$b$. Such securement is effected by means of an interposed layer of the aforesaid imperfect insulating material, shown at RC1, which thus provides the dielectric for the small capacitance formed between the ends of grid elements $g1$ and the Lecher strip L1$a$ and at the same time provides a leaky path between said elements and strip thus constituting the resistances R.

A similar set of horizontal grid elements $g2$ has its ends secured to a vertical strip L2$a$ constituting one conductor of the vertical Lecher system L2$a$, L2$b$. The grid elements $g2$ are spaced forwardly from, i.e. on the anode side of, the elements $g1$ so that the two grid systems effect together bi-grid control of the anode current. The effectively planar cathode K is shown as a series of filaments spaced rearwardly from the grid system, whereas the anode A$n$ is provided as a mesh of thin wires carried on a glass screen plate S spaced forwardly of the grid system, phosphor Ph being deposited on the plate S between the wires of the anode mesh. As an alternative to the mesh, a transparent conductive coating may be used.

The planar electrode system is enclosed, together with the operative portions of the two Lecher lines, within a flat generally rectangular envelope E formed of two halves sealed together at $e$. In spite of the large area of the planar electrode system, the cathode current taken is small since it is always localised at one picture element.

Since the grid system remote from the cathode will have its grid current restricted by the action of the other grid, it may be advisable not to rely on grid current rectification by this means but to provide in effect diode rectification by allowing the ends of the grid wires $g2$ to be directly exposed to the cathode at a marginal zone e.g. as shown at the left of Figure 5.

It may be advantageous to extend the use of such an auxiliary diode system also to the other grid by extending wires $g1$ into a second marginal zone. In this event video modulation may be applied to the planar cathode system K, but this requires the provision of separate cathode filaments for both marginal zones which filaments are insulated from affecting the diode rectification process. Otherwise, modulation may of course be applied to a third planar grid between grid $g2$ and the anode.

The use of an auxiliary diode system allows a smoothing circuit to be incorporated whereby the presence of radio-frequency voltages on the grids, as referred to above, may be considerably reduced. This may be accomplished by having a grid wire indirectly fixed to the anode of the co-operating auxiliary diode so that it is connected through a resistive strip. The latter, in combination with the capacity of the grid wire to earth, constitutes the said smoothing circuit.

Each Lecher line is constructed asymmetrically to permit all its grid wires to be fed from one of its conductors. Thus line L1*a*, L1*b* may be regarded as having a live conductor L1*a* upon which the standing wave exists and which supplies the grid wires $g1$, and a ground conductor L1*b* which is wider than L1*a* to simulate a ground plane.

The over all thickness of the device of Figure 6 may be of the order of 3 inches with width and height dimensions of the order of 24 x 20 inches respectively.

Although the grid elements $g1$, $g2$ have been shown for clarity of illustration as strips having aligned perforations, in practice each strip may be replaced by a pair of spaced wires having their ends connected together at the point of securement to the material RC1 or RC2.

What is claimed is:

1. Apparatus for selecting from or for scanning over a plurality of positions or elements, comprising a line having a pair of elongated electrically conductive members arranged substantially mutually parallel, means connected to associate sections of said line along the length thereof with respective ones of said positions or elements, means for establishing a continuous electromagnetic wave having a node on said line, means for causing said node to select a desired position or element, and means varying the effective electrical lengths of the end portions of said line in a complementary manner thereby causing said node to move along said line.

2. Apparatus for selecting from or for scanning over a plurality of positions or elements, comprising a line having a pair of elongated electrically conductive members arranged substantially mutually parallel, means connected to associate sections of said line along the length thereof with respective ones of said positions or elements, means for establishing a continuous electromagnetic wave having a node on said line, means for causing said node to select a desired position or element, an electrical discharge system having a cathode, an anode and a discharge control system, and means connecting said discharge control system to said line, whereby the discharge in said electrical discharge system is controlled in accordance with the position of said node on said line.

3. Apparatus for selecting from or for scanning over a plurality of positions or elements, comprising a line having a pair of elongated electrically conductive members arranged substantially mutually parallel, means connected to associate sections of said line along the length thereof with respective ones of said positions or elements, means for establishing a continuous electromagnetic wave having a node on said line, and selecting means for causing said node to select a desired position or element, said selecting means including a plurality of rectification means connected respectively to said sections of the line so as to rectify any electric wave energy which may be present at the respective sections of the line, whereby a different value of rectified voltage is obtained at that section of the line at which said node is located, a desired position or element being selected in accordance with said value of rectified voltage.

4. Apparatus for selecting from or for scanning over a plurality of positions or elements, comprising a line having a pair of elongated electrically conductive members arranged substantially mutually parallel, means connected to associate sections of said line along the length thereof with respective ones of said positions or elements, means for establishing a continuous electromagnetic wave having a node on said line, and selecting means for causing said node to select a desired position or element, said selecting means including a plurality of rectification means connected respectively to said sections of the line so as to rectify any electric wave energy which may be present at the respective sections of the line, whereby a different value of rectified voltage is obtained at that section of the line at which said node is located, a desired position or element being selected in accordance with said value of rectified voltage, each of said rectification means comprising a peak rectifier circuit including a resistance-capacitance network.

5. Apparatus for selecting from or for scanning over a plurality of positions or elements, comprising a line having a pair of elongated electrically conductive members arranged substantially mutually parallel, means connected to associate sections of said line along the length thereof with respective ones of said positions or elements, means for establishing a continuous electromagnetic wave having a node on said line, and selecting means for causing said node to select a desired position or element, said selecting means including a plurality of rectification means connected respectively to said sections of the line so as to rectify any electric wave energy which may be present at the respective sections of the line, whereby a different value of rectified voltage is obtained at that section of the line at which said node is located, a desired position or element being selected in accordance with said value of rectified voltage, each of said rectification means comprising a peak rectifier circuit including a resistance capacitance network composed of a strip of imperfectly insulating dielectric material interposed between said line and each of said positions or elements.

6. Apparatus for selecting from or for scanning over a plurality of positions or elements, comprising a line having a pair of elongated electrically conductive members arranged substantially mutually parallel, connecting means connected to associate sections of said line along the length thereof with respective ones of said positions or elements, means for establishing a continuous electromagnetic wave having a node on said line, means for causing said node to select a desired position or element, and an electrical discharge system having a cathode, an anode and a plurality of discharge control electrodes constituting said connecting means, said control electrodes being positioned between said anode and cathode and connected to said sections of the line, whereby said control electrodes cause rectification of wave energy fed thereto from said line thereby establishing bias voltages at said control electrodes in accordance with the amount of wave energy at the respective sections of the line.

7. Apparatus for selecting from or for scanning over a plurality of positions or elements, comprising a pair of substantially planar grid structures positioned in parallel alignment, each of said grid structures comprising a plurality of grid elements arranged so that the elements of the first said grid structure cross over the elements of the second said grid structure at localized regions corresponding to said positions or elements, means for selecting an element of said first grid structure, and means for selecting an element of said second grid structure, at least one of said selecting means comprising a line having a pair of elongated electrically conductive members arranged substantially mutually parallel, means connecting the grid elements of one of said grid structures respectively to sections of said line along the length thereof, means for establishing a continuous electromagnetic wave having a node on said line, and means for causing the position of said node to move along said line and to select a desired grid element.

8. Apparatus as claimed in claim 7, including a planar cathode and a planar anode positioned in parallel alignment on opposite sides of said pair of grid structures to provide an electron discharge device wherein said grid structures act together as a control grid for controlling the electron discharge in said device.

9. Apparatus as claimed in claim 8, including a plurality of auxiliary anodes connected respectively to the grid elements of at least one of said grid structures at points outside the area where said first grid elements cross over said second grid elements, and a second cathode positioned with respect to said auxiliary anodes to provide a plurality of rectifiers.

10. Apparatus as claimed in claim 9, in which each of said auxiliary anodes and the grid element connected thereto comprise a single electrical conductor.

11. Apparatus as claimed in claim 9, including a source of modulation voltage connected to said second cathode.

12. An electric discharge device comprising a substantially planar cathode and a substantially planar anode positioned substantially mutually parallel, a pair of substantially planar grid structures positioned in spaced parallel alignment between said cathode and anode and each comprising a plurality of grid elements arranged so that the elements of the first grid structure cross over the elements of the second grid structure, means for selecting an element of said first grid structure, means for selecting an element of said second grid structure, at least one of said selecting means comprising a line having a pair of elongated electrically conductive members arranged substantially mutually parallel, means connecting the grid elements of one of said grid structures respectively to sections of said line along the length thereof and means for applying a continuous electromagnetic signal to said line for selecting a desired grid element, whereby said grid structures provide localized control of an electron discharge between said cathode and anode, and a luminescent display screen positioned in the path of the controlled electron discharge.

References Cited in the file of this patent

UNITED STATES PATENTS

| | | |
|---|---|---|
| 1,789,219 | Davis | Jan. 13, 1931 |
| 1,884,593 | Davis | Oct. 25, 1932 |
| 2,313,286 | Okolicsanyi | Mar. 9, 1943 |
| 2,409,222 | Morton | Oct. 15, 1946 |
| 2,444,221 | Craig | Jan. 29, 1948 |
| 2,450,618 | Smullin et al. | Oct. 5, 1948 |
| 2,500,929 | Chilowsky | Mar. 21, 1950 |
| 2,532,175 | Linder | Nov. 28, 1950 |
| 2,558,019 | Toulon | June 26, 1951 |
| 2,614,234 | Voge | Oct. 14, 1952 |
| 2,642,547 | Rodenhuis | June 16, 1953 |
| 2,670,402 | Marks | Feb. 23, 1954 |
| 2,795,731 | Aiken | June 11, 1957 |
| 2,818,531 | Peek | Dec. 31, 1957 |

FOREIGN PATENTS

| | | |
|---|---|---|
| 125,174 | Australia | Aug. 28, 1947 |